Patented Dec. 28, 1948

2,457,684

UNITED STATES PATENT OFFICE 2,457,684

MANUFACTURE OF SPONGE POLYCHLOROPRENE RUBBER

Norman A. Klemp, Mishawaka, Ind., assignor to United States Rubber Company, New York, N. Y., a corporation of New Jersey No Drawing. Application March 17, 1945, Serial No. 583,393

4 Claims. (Cl. 260—29.7)

This invention relates to the manufacture of sponge rubber and more particularly to the manufacture of sponge rubber from polychloroprene latex.

Polychloroprene latex, commercially known as neoprene latex, is a synthetic rubber latex which is formed by the emulsion polymerization in aqueous medium of chloro-2-butadiene-1,3 (chloroprene). Sponge rubber may be produced from such an emulsion polymerizate of chloro-2-butadiene-1,3, or polychloroprene latex, in a manner similar to the manufacture of sponge rubber from natural rubber latex, as by whipping the polychloroprene latex composition into a foam, pouring the foam into molds, setting the foam to an irreversible gel by means of a gelling agent, such as alkali silicofluoride, and drying and vulcanizing the gelled polychloroprene latex foam to form sponge rubber. The setting of the foam to an irreversible gel in the molds may be made to take place at room temperature, or the gelling action may be accelerated by raising the temperature. The polychloroprene latex compound containing zinc oxide may be whipped up into a foam or froth after which the alkali silicofluoride gelling agent may be mixed into the foam in a mixing apparatus just prior to pouring into the molds, in order to prevent premature gelling of the foam. The zinc oxide, which also sensitizes the polychloroprene latex, may, if desired, be added with the alkali silicofluoride to the prewhipped foam before molding. The mixing apparatus may be equipped to whip the polychloroprene latex into a foam, or only to mix in the alkali silicofluoride, and zinc oxide if this is added subsequent to the foaming, where the foam is prepared in a separate whipper and transferred to the mixing apparatus for addition of the sensitizing chemicals. When the sensitized foam is poured into the molds, there remains in the mixing apparatus, and on the mixing paddles or whipping wires and the like, a certain amount of ungelled polychloroprene latex foam which must be removed before a new batch of polychloroprene latex foam is mixed therein. It is desired to recover or salvage this waste foam and utilize it in the process.

The present invention relates to a method of recovering the waste sensitized polychloroprene latex foam remaining in the mixing apparatus after pouring the foam into molds in such a liquid condition that it may be further processed in a manner similarly to new polychloroprene latex, and more particularly may be added to a new polychloroprene latex mix before foaming without detrimentally affecting the sponge rubber prepared from such a polychloroprene latex composition containing both the new polychloroprene latex mix and the recovered foam.

According to United States patent to Clayton and Hoover No. 2,313,463, assigned to the assignee of the present application, the waste sensitized foam in the manufacture of sponge rubber from natural rubber latex may be recovered by dispersing the foam in a wash liquid comprising an aqueous medium containing small amounts of an alkali hydroxide and a material which is stated to be capable of precipitating zinc ions, for example, alkali tetraborate, carbonate or metaphosphate. Sufficient ungelled foam remaining in the mixing device may be dispersed in such wash liquid to bring the rubber content of the wash solution to 40% or more, at which concentration the wash liquid may be added directly to a new natural latex mix in preparing a composition for foaming. The alkali hydroxide in such a process prevents the gradual hydrolysis of the silicofluoride with consequent precipitation of the rubber particles. This process wherein the wash liquid contains an alkali hydroxide and a material such as an alkali tetraborate or carbonate or metaphosphate will not successfully disperse ungelled sensitized foam where sponge rubber is made from polychloroprene latex rather than natural rubber latex, and a different type of wash liquid must be used with polychloroprene latex foam containing zinc oxide and alkali silicofluoride.

According to the present invention, waste polychloroprene latex foam remaining in the mixing apparatus after the pouring operation and before it has set to an irreversible gel, is dispersed in a wash liquid comprising an aqueous medium containing a buffering agent which is capable of removing polyvalent zinc ions, and a stabilizer which may be either of the well known non-ionic type of surface-active agent, i. e. a compound which does not ionize in water but which acts as a stabilizer, such as the commercial compounds which are complex ethers made by treating alcohols, acids or phenols with ethylene oxide, or of the well known anion-active type of stabilizer, i. e. a compound which ionizes to give an organophilic anion, such as the commercial compounds having the general formula R—SO₃—M, where M represent alkali metal, hydrogen or ammonium, and R represents an organic radical containing at least one group having more than 8 carbon atoms. Such a wash liquid containing the buffering agent which is capable of removing polyvalent zinc ions and the stabilizer will disperse the sensitized polychloroprene latex foam before it has set, but unlike the wash liquid in the prior Clayton and Hoover Patent No. 2,313,463, which can be made up to a concentration of natural rubber solids of 40% or more, the wash liquid in the present case will not disperse the polychloroprene latex foam to a concentration of over about 30% polychloroprene content, and generally to only about 20% concentration without unduly destabilizing and ultimately coagulating the recovered wash liquid. Such low concentrations of polychloroprene may be satisfactory for the manufacture of various articles made by processes not involving foaming, but are not satisfactory for adding to new polychloroprene latex in the utilization of the waste liquid in the foam sponge process. In order to utilize the recovered wash liquid back in the foaming process, it is further necessary to concentrate the same to a polychloroprene content of above 40% and preferably above 50%, and this may be accomplished by a creaming operation, as described below. The concentrations of buffering agent and stabililizer in the wash solution are not critical, 1 to 10% of each in wash solutions having been found satisfactory. By "dispersing" the foam in the aqueous medium is meant the breaking up of the foam structure and the dissemination of the suspended polychloroprene particles in the synthetic latex film comprising the wall structure into the aqueous medium of the wash liquid. The buffering agent which is capable of removing polyvalent zinc ions may be an alkali carbonate, borate including tetraborate, phosphate, sulphite, oxalate, ferrocyanide, ferricyanide, chromate. Such materials perform the dual function of acting as a buffering agent to prevent the gradual hydrolysis of the silicofluoride with consequent precipitation of the polychloroprene particles, and also removing the coagulating polyvalent zinc ions from solution by precipitating or insolubilizing the zinc, or by forming relatively soluble but unionized compounds. It is necessary to remove the zinc ions to prevent thickening and destabilization of the wash liquid on standing and also to permit creaming of the wash liquid to materially increase the polychloroprene content for mixing with fresh polychloroprene latex, as above described. The term "alkali" referring to the carbonates, borates, phosphates, sulphites, oxalates, ferrocyanides, ferricyanides and chromates, which are exemplary of various common materials capable of removing polyvalent zinc ions, is used in its commonly accepted sense as inclusive of the ammonium and alkali-metal salts but exclusive of the polyvalent metal salts. Neither the buffering agent which removes zinc ions nor the stabilizer alone is capable of recovering the sensitized foam without thickening and coagulating the same.

Illustrative of the non-ionic type of surface-active agent which may be used as stabilizers in the present invention are the reaction products of ethylene oxide with an aliphatic alcohol or an aliphatic acid having more than 8 carbon atoms, or with a phenol, for example, the reaction product of ethylene oxide and oleyl alcohol, generally considered to have the formula

where $n$ may be around 10 to 20; the reaction product of ethylene oxide and lauric acid,

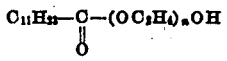

where $n$ may be around 10 to 20; the reaction product of ethylene oxide and oleic acid,

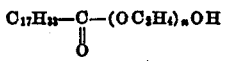

where $n$ may be around 10 to 20; the reaction product of ethylene oxide and p-isopropyl phenol,

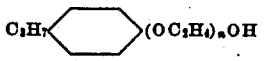

where $n$ may be around 10 to 20. Illustrative of the anion-active type of surface-active agent having the general formula R—SO₃—M, where M represents alkali metal, hydrogen or ammonium, and R represents an organic radical containing at least one group having more than 8 carbon atoms and which may be used as stabilizers in the present invention are:

(1) Alkyl sulphates, for example, various compounds from C₈H₁₇OSO₃Na to C₁₈H₃₇OSO₃Na.

(2) Alkyl sulphonates, as for example, the compounds C₁₂H₂₅SO₃Na and C₁₆H₃₃SO₃Na.

(3) Sulphonated and sulphated mixed ethers of long and short chain aliphatic groups, as for example, C₁₇H₃₃—O—C₂H₄—SO₃Na and C₁₇H₃₃—O—C₂H₄—O—SO₃Na (4) Sulphonated and sulphated alkyl esters of long chain fatty acids, as for example

and

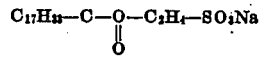

(5) Sulphonated alkyl substituted amides of long chain fatty acids, as for example,

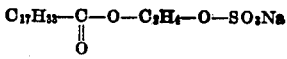

and

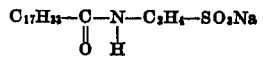

(6) Alkylated aryl sulphonates, as for example, isopropyl naphthalene sodium sulphonate and dodecyl benzene sodium sulphonate.

(7) Hydro aromatic sulphonates, for example, octa-hydro-anthracene sodium sulphonate, and tetra-hydro-naphthalene sodium sulphonate.

(8) Alkyl sulfosuccinates, as for example, various compounds having the formula

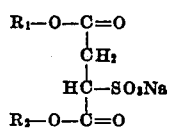

in which one of R₁ and R₂ may be an alkyl radical from C₃H₇— to C₈H₁₇— and the other hydrogen, or each of R₁ and R₂ is an alkyl radical from C₃H₇— to C₈H₁₇—. Cation-active types of surface-active agents, such as the quaternary ammonium salts, which ionize to give organophilic cations, are not satisfactory.

In practice, the ungelled polychloroprene latex foam remaining in the mixer and adhering to the mixing paddles or whip wires, and to other parts of the mixing apparatus, is dispersed in a body of the wash liquid containing a buffering agent capable of removing polyvalent zinc ions and a stabilizer as described above, after each batch of foam is poured, and the neoprene content of the wash liquid is built up from the foam remaining after such successive batches until the neoprene content of the wash liquid reaches the desired concentration. Sufficient foam may readily be dispersed in the wash solution to bring the polychloroprene content of the wash solution to 10 to 30% concentration. This is too low a solids content to mix directly with a new polychloroprene latex for foaming, and therefore, the wash or recovery liquid is first creamed by adding a conventional hydrophilic colloidal creaming agent and allowing the liquid to stand until it separates into a sub-natant polychloroprene-rich or cream fraction, and a super-natant polychloroprene-poor or serum fraction, after which the polychloroprene-rich fraction may be separated and used with new polychloroprene latex in preparing compounds for subsequent foaming. The polychloroprene content of the wash liquid containing the dispersed polychloroprene latex foam may readily be raised by creaming methods from 10–30% to over 40% and readily to 55–60%. The polychloroprene-rich fraction resulting from the creaming of the wash or recovery liquid may be added to a new polychloroprene latex mix for frothing in an amount such that the polychloroprene from the creamed wash liquid is as much as 15% or more of the polychloroprene content of the polychloroprene latex mix. In practice, only 10% of the polychloroprene content of a polychloroprene latex mix needs to come from the polychloroprene-rich portion of the creaming operation in order to utilize all the recovered polychloroprene from the waste foam in the process.

The following example is illustrative of the present invention:

A polychloroprene latex composition of the following formulation containing both fresh polychloroprene latex and the polychloroprene-rich fraction, or cream portion from the creaming of the recovered wash liquid, as above referred and as described in detail below, was whipped into a foam in a conventional Hobart whipper:

|  | Dry Weight | Wet Weight |
|---|---|---|
| New Polychloroprene Latex (60% solids concentration) | 100 | 167 |
| Creamed Recovered Wash Liquid (60% concentration) | 11 | 18 |
| Soap (stabilizer) | .75 | 4 |
| Carbon Black (coloring) | 1 | 3.5 |
| Zinc oxide | 5 | 18 |

After whipping to the desired foam density, the foam was transferred to a mixing apparatus equipped with stirring paddles and was sensitized by mixing therein four parts of a 50% aqueous suspension of sodium silico fluoride. The foam was then poured into molds, set to an irreversible gel in 4 minutes at 72° F., and vulcanized, washed and dried to final sponge rubber. The foam remaining in the mixing apparatus and adhering to the paddles was dispersed in an aqueous solution containing 2% sodium sulfite and 1.5% of the sodium salt of isopropyl naphthalene sulphonic acid, by stirring the wash solution in the mixer for a short time to break up the foam structure and disseminate the neoprene particles in the wash liquid. The foam remaining in the mixing apparatus from subsequent batches was similarly dispersed in the same wash solution containing the sodium sulphite and sodium salt of isopropyl naphthalene sulfonic acid until a concentration of about 20% polychloroprene had been built up. The recovered wash liquid containing 20% polychloroprene was creamed by adding six parts of a 1.5% aqueous solution of ammonium alginate per 100 parts of the 20% aqueous suspension of the polychloroprene and allowed to stand at room temperature for 48 hours. After this time, the recovered wash liquid had separated into a supernatant polychloroprene-poor fraction and a subnatant polychloroprene-rich fraction, which fractions were separated, and the polychloroprene-rich fraction or cream portion mixed with fresh polychloroprene latex, as in the above formulation.

Various other vegetable mucilages than the ammonium alginate described above, may be used to cream the recovered wash solution, for example, pectin bodies, Irish moss, locust seed or carob bean gum, as is well known in the creaming of synthetic and natural rubber latices. Also, other stabilizers, as above described, and alkali carbonates, tetraborates, and phosphates instead of the alkali sulphite as shown, may be used in the wash solution for recovering the polychloroprene from the ungelled sensitized polychloroprene latex foam.

This application is a continuation-in-part of appliction Serial No. 541,473, filed June 21, 1944, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of recovering a stable liquid composition from an ungelled polychloroprene latex foam containing zinc oxide and alkali silicofluoride which comprises dispersing said foam in an aqueous medium containing material selected from the group consisting of alkali carbonates, borates, phosphates, sulfites, oxalates, ferrocyanides, ferricyanides and chromates and a stabilizer selected from non-ionic surface-active agents which are reaction products of ethylene oxide with material from the group consisting of aliphatic alcohols having more than 8 carbon atoms, aliphatic acids having more than 8 carbon atoms, and phenols, and anion-active surface active agents having the general formula $R-SO_3-M$, wherein M represents a radical selected from the group consisting of alkali metal, hydrogen, and ammonium, and R represents an organic radical containing at least one group having more than 8 carbon atoms, said anion-active surface-active agent being selected from the group consisting of alkyl sulphates, alkyl sulphonates, sulphonated and sulfated mixed ethers of long and short chain aliphatic groups, sulphonated and sulphated alkyl esters of long chain fatty acids, sulphonated alkyl substituted amides of long chain fatty acids, alkylated aryl sulphonates of the naphthalene and benzene series, hydroaromatic sulphonates of the anthracene and naphthalene series, and alkyl sulfosuccinates.

2. The method of recovering a stable liquid composition from an ungelled polychloroprene latex foam containing zinc oxide and alkali silicofluoride which comprises dispersing said foam in an aqueous medium containing material selected from the group consisting of alkali carbonates, borates, phosphates, sulfites, oxalates, ferrocyanides, ferricyanides and chromates, and a stabilizer having the general formula R—SO$_3$—M, wherein M represents a radical selected from the group consisting of alkali metal, hydrogen, and ammonium, and R represents an organic radical containing at least one group having more than 8 carbon atoms, said stabilizer being selected from the group consisting of alkyl sulphates, alkyl sulphonates, sulphonated and sulfated mixed ethers of long and short chain aliphatic groups, sulphonated and sulphated alkyl esters of long chain fatty acids, sulphonated alkyl substituted amides of long chain fatty acids, alkylated aryl sulphonates of the naphthalene and benzene series, hydroaromatic sulphonates of the anthracene and naphthalene series, and alkyl sulfosuccinates.

3. A method of recovering a stable liquid composition from an ungelled polychloroprene latex foam containing zinc oxide and alkali silicofluoride that may be admixed with fresh polychloroprene latex and reused in the foam process which comprises dispersing said ungelled foam in a wash liquid comprising an aqueous medium containing material selected from the group consisting of alkali carbonates, borates, phosphates, sulfites, oxalates, ferrocyanides, ferricyanides and chromates, and a stabilizer selected from non-ionic surface-active agents which are reaction products of ethylene oxide with material from the group consisting of aliphatic alcohols having more than 8 carbon atoms, aliphatic acids having more than 8 carbon atoms and phenols, and anion-active surface active agents having the general formula R—SO$_3$—M, wherein M represents a radical selected from the group consisting of alkali metal, hydrogen, and ammonium, and R represents an organic radical containing at least one group having more than 8 carbon atoms, said anion-active surface-active agents being selected from the group consisting of alkyl sulphates, alkyl sulphonates, sulphonated and sulfated mixed ethers of long and short chain aliphatic groups, sulphonated and sulphated alkyl esters of long chain fatty acids, sulphonated alkyl substituted amides of long chain fatty acids, alkylated aryl sulphonates of the naphthalene and benzene series, hydroaromatic sulphonates of the anthracene and naphthalene series, and alkyl sulfosuccinates, until the concentration of chloroprene in the wash liquid is from 10% to 30% and creaming said wash liquid to a concentration of over 40% polychloroprene, whereby the concentration of polychloroprene in the thus creamed wash liquid is high enough so that it may be admixed with fresh polychloroprene latex for use in subsequent foaming operations.

4. The method of recovering a stable liquid composition from an ungelled polychloroprene latex foam containing zinc oxide and alkali silicofluoride that may be admixed with fresh polychloroprene latex and reused in the foam process which comprises dispersing said ungelled foam in a wash liquid comprising an aqueous medium containing material selected from the group consisting of alkali carbonates, borates, phosphates, sulfites, oxalates, ferrocyanides, ferricyanides and chromates, and a stabilizer having the general formula R—SO$_3$—M, wherein M represents a radical selected from the group consisting of alkali metal, hydrogen, and ammonium, and R represents an organic radical containing at least one group having more than 8 carbon atoms, said stabilizer being selected from the group consisting of alkyl sulphates, alkyl sulphonates, sulphonated and sulfated mixed ethers of long and short chain aliphatic groups, sulphonated and sulphated alkyl esters of long chain fatty acids, sulphonated alkyl substituted amides of long chain fatty acids, alkylated aryl sulphonates of the naphthalene and benzene series, hydroaromatic sulphonates of the anthracene and naphthalene series, and alkyl sulfosuccinates, until the concentration of chloroprene in the wash liquid is from 10% to 30%, and creaming said wash liquid to a concentration of over 40% polychloroprene, whereby the concentration of polychloroprene in the thus creamed wash liquid is high enough so that it may be admixed with fresh polychloroprene latex for use in subsequent foaming operations.

NORMAN A. KLEMP.

REFERENCES CITED

The following references are of record in the file of this patent:

UNITED STATES PATENTS

| Number | Name | Date |
|---|---|---|
| 2,359,698 | Uhlig | Oct. 3, 1944 |